//3,403,602
United States Patent Office
Patented Oct. 1, 1968

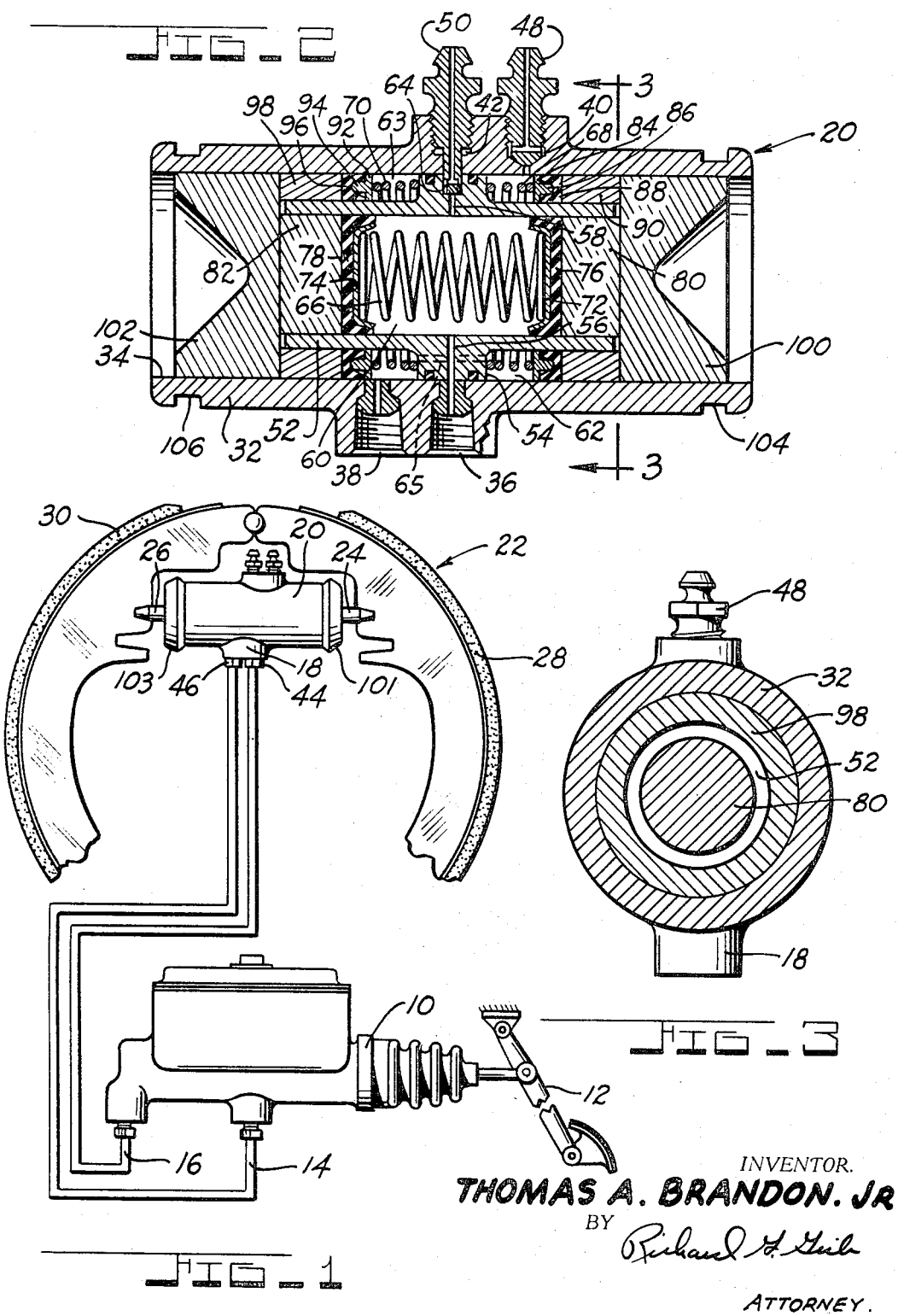

3,403,602
DUAL WHEEL CYLINDER
Thomas A. Brandon, Jr., Ann Arbor, Mich., assignor to
The Bendix Corporation, a corporation of Delaware
Filed Sept. 26, 1966, Ser. No. 582,151
5 Claims. (Cl. 92—61)

ABSTRACT OF THE DISCLOSURE

A dual piston wheel cylinder having a housing with a partition means therein separating the housing into first and second concentric chambers for first and second pistons whose effective area in said chambers are equal with means to communicate separate fluid pressures to said first and second chambers through the housing and partition means, respectively.

---

The primary purpose of this invention is to retain normal braking geometry in the event of a hydraulic failure. This will further result in no increase in fluid displacement to the intact side of the system and retain 50% of the initial brake effectiveness.

In order to provide fail-safe braking features for vehicles split system master cylinders have been incorporated in vehicles. These master cylinders have been utilized to provide independent pressures for actuation of front and rear brakes, for example. In some prior art devices such as seen by British Patent No. 951,906 it has been suggested that each wheel brake be provided with means to receive these independent pressures so that braking pressure will be available to all wheels whenever one side of the split system has failed. However, in devices of this type a unitary piston has been provided having separate surfaces upon which the independent pressures operate. This has a distinct disadvantage in that piston seizure due to wear, fluid contamination, etc. will render the vehicle brake inoperative. It is a principal object of this invention to provide a dual wheel cylinder with independent pressure responsive means to preclude the seizure of one from affecting the other.

It should also be noted that the assignee for this application also has pending an application Ser. No. 466,356, filed June 23, 1965, now Patent No. 3,312,313 which relates to a dual actuator means for brakes wherein there is disclosed independent piston means. However, in this copending application the piston means are of unequal area which would mean that the master cylinder for operating these actuators would have to be designed for developing not only different pressures but unequal displacement. It is therefore another object of this invention to eliminate this problem so as to avail the use of present technology in master cylinder construction and avoid a loss of braking effectiveness when only one of two possible pressures is available for brake actuation.

Other objects and advantages will appear to those skilled in the art to which this invention relates from the following description of the drawings in which:

FIGURE 1 is a schematic presentation of a split-system brake arrangement in a vehicle showing one wheel brake incorporating a dual wheel cylinder in accordance with the principles of this invention;

FIGURE 2 is a cross sectioned side view of a dual wheel cylinder according to the principles of this invention; and FIGURE 3 is a cross sectional view on lines 3—3 of FIGURE 2.

With particular regard to FIGURE 1, there is shown a split or dual master cylinder 10 acutatable by a brake pedal 12 for developing separate brake pressures for conduits 14 and 16. These conduits are connected to inlet port means 18 of a dual wheel cylinder 20 located in this instance in a conventional drum brake 22. The dual wheel cylinder controls links 24 and 26 which expand brake shoes 28 and 30 to contact a drum (not shown) rotatable with the vehicle wheel. The shoes, as may be appreciated by those skilled in the art, are held inwardly by return spring means (not shown) which also bias the links 24 and 26 inwardly of the wheel cylinder 20.

The wheel cylinder 20 is constructed from a cast housing 32 having a longitudinal bore 34 (see FIGURE 2). The housing is, after casting, machined to have a smooth wall for the bore and radial drilling is accomplished to provide pressure inlet ports 36 and 38 as well as bleed ports 40 and 42. These ports are then threaded for receipt of fittings 44 and 46 and bleed valves 48 and 50.

In a preferred constructional technique a center section having a sleeve or cylindrical body 52 with an annular ring section 54 is press fitted into the bore 34. The center section is provided with passages 56 and 58 leading from inlet port 36 and bleed port 42 to an inner chamber 60, and the section 54 is located adjacent the opening into an outer chamber comprising portions 62 and 63 of inlet port 38 and bleed port 40. The bleed valve 50 is provided with a lower projection 64 that engages sidewalls of passage 58 to prevent dislodging of the center section. The chamber 62 on both sides of section 54 is connected by axial passages 65 through section 54.

A center spring 66 and two outer springs 68 and 70 on either side of section 54 are then inserted in the wheel cylinder. Spring 66 is placed during assembly between spring bearing plates 72 and 74 resting against cup seals 76 and 78 of disc type pistons 80 and 82 within the sleeve 52. Spring 68 bears on a spring bearing plate 84 having a seal expanding projection 86 for the dual lip annular seal 88 thereby forced against annular piston 90. Similarly, spring 70 to the left of section 54, bears against plate 92 forcing projection 94 into the dual lip seal 96 that in turn is forced against annular piston 98. Thus, the outer chamber 62 is sealed from the outside as is chamber 60.

The wheel cylinder assembly is completed by the closing of the open ends of bore 34 with plungers 100 and 102 which are abutted by pistons 80, 90 and 82, 98, respectively. Rubber boots 101 and 103 are attached to the housing 32 by snap fitting beaded portions thereof into grooves 104 and 106.

In operation, and assuming there is no failure of any of the separate pressures developed by master cylinder 10, the chambers 60, 62 and 63 will receive the pressures from conduits 14 and 16, respectively. As this pressure in chambers 60, 62 and 63 overcomes the force of the brake return spring, plungers 100 and 102 will be moved outwardly by pistons 80, 90 and 82, 98, respectively, to cause links 24 and 26 to expand shoes 28 and 30 against the brake drum to retard the rotational velocity of the drum.

Pistons 80 and 90 as well as pistons 82 and 98 are all of equal effective area so that the pressure and displacement required to operate plungers 100 and 102 is also equal once fluid is throughout the brake system and air is bled therefrom.

Thus, it may be expected that in the event of failure in one side of the master cylinder, as by a rupture in one or the other conduits 14 or 16, there will be no additional displacement increase necessary on the other side to maintain adequate brake pedal travel for the operator of the vehicle.

I claim:
1. A wheel cylinder for actuating a vehicle brake, said cylinder comprising:
   a housing having a bore with passage means communicating said bore to a first port means and a second port means;

a partition affixed in said bore to divide said bore into concentric first and second chambers one of which is opened to said first port means, said partition including a sleeve having an annular ring section which is affixed to said housing to cover said second port means and be adjacent said first port means, said section having circumferentially spaced radial passages with at least one of said passages connecting said other chamber to said second port means, said first and second chambers having equal areas within said bore;

a first piston means in said first chamber;

a second piston means of equal effective area as said first piston means in said second chamber; and plunger means operatively connected to both said first and second piston means to be operated thereby jointly or severally.

2. A wheel cylinder according to claim 1 and further comprising a fitting in said second port means which fitting has a tubular extension mating with a groove in said section between seal means carried thereby to locate said partition in said bore.

3. A wheel cylinder according to claim 1 wherein said section has axial passage means communicating portions of said first chamber on either side of said section which separates said portions.

4. A wheel cylinder comprising:

a housing having a bore, first inlet port means, second inlet port means, first bleed port means and second bleed port means;

plunger means in said bore adjacent an open end thereof;

a center section within said bore having a sleeve portion with an annular ring section locating said sleeve portion in said bore creating coaxial chambers within said housing, said section having an axial passageway communicating portions of said outer chamber, a radial passageway underlying said second inlet port adjacent to said first inlet port, and a radially counterbored passage means underlying said second bleed port adjacent to said first bleed port such that the first inlet port and first bleed port are open to an outer chamber and said second inlet port and said second bleed port are open to an inner chamber, said outer and inner chambers comprise said coaxial chambers;

annular piston means in said outer chamber which annular piston means is operatively connected to said plunger means; and disc type piston means of equal area as said annular piston means, said disc type piston means being within said inner chamber and operatively connected to said plunger means.

5. A wheel cylinder according to claim 4 and further comprising bleed valve means in said first bleed port and said second bleed port with said bleed valve means in said second bleed port including means to engage the counterbored passage means in said section and thereby locate said center section in said bore.

References Cited

UNITED STATES PATENTS

| | | | |
|---|---|---|---|
| 1,684,743 | 9/1928 | Reilly | 92—75 X |
| 2,140,742 | 12/1938 | Goepfrich | 188—152.82 X |
| 2,466,425 | 4/1949 | House et al. | 92—75 |
| 2,497,438 | 2/1950 | Butler | 92—65 X |
| 3,011,315 | 12/1961 | Menichello | 92—75 |
| 3,155,197 | 11/1964 | Lee et al. | 188—106 |
| 3,312,313 | 4/1967 | Moyer | 92—61 X |
| 3,358,448 | 12/1967 | Huffman | 92—75 X |

MARTIN P. SCHWADRON, *Primary Examiner.*

I. C. COHEN, *Assistant Examiner.*